J. BRIGGS.
CONTROL FOR AUTOMATIC CROSSING GATES.
APPLICATION FILED MAR. 31, 1917.
1,367,684.
Patented Feb. 8, 1921.
3 SHEETS—SHEET 1.
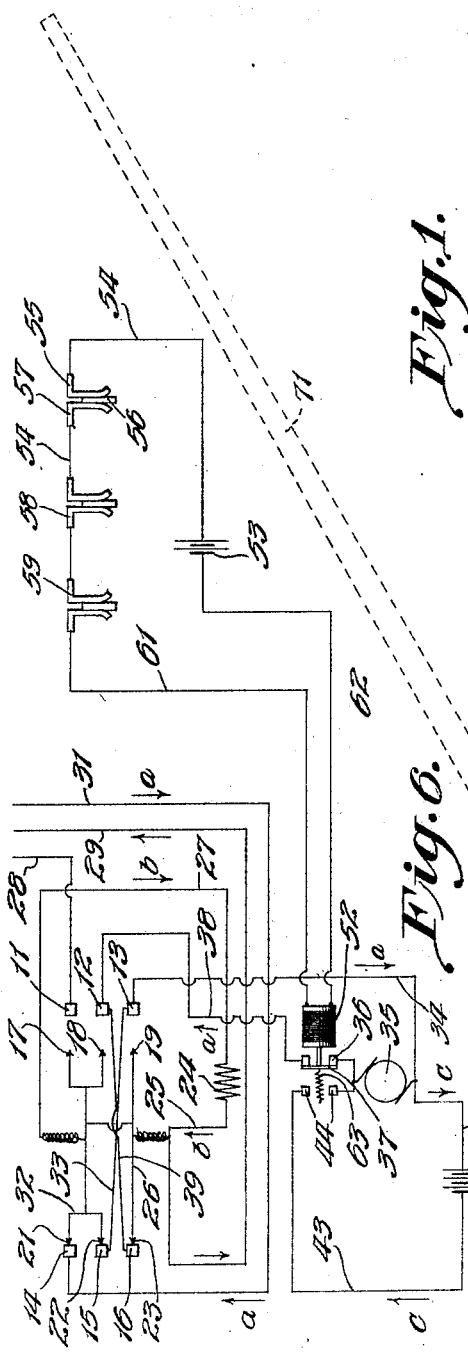
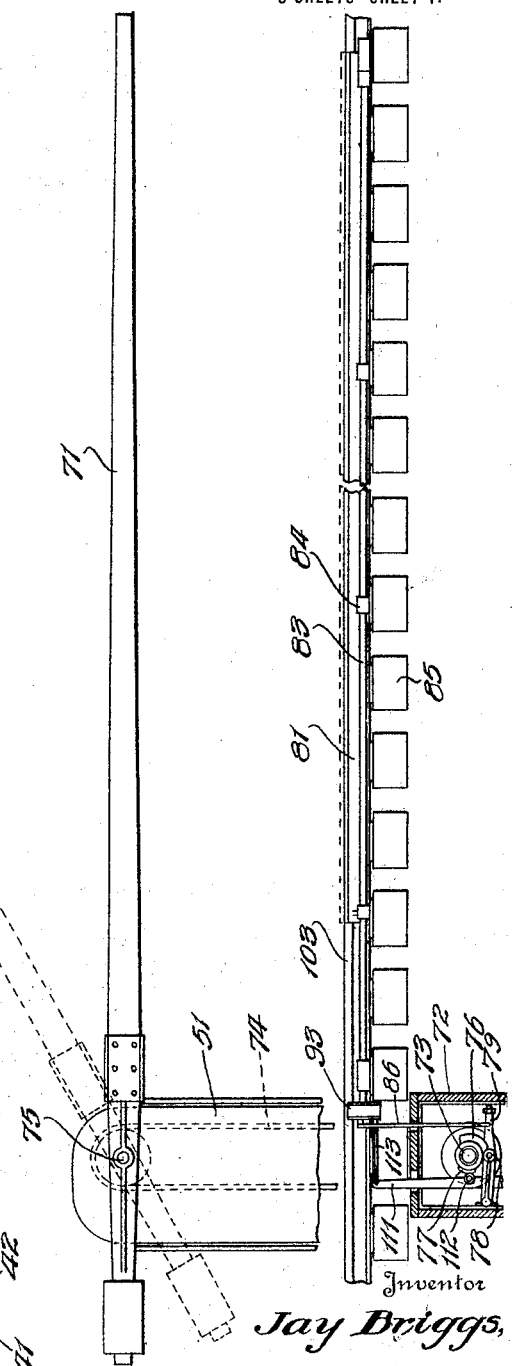
Inventor
Jay Briggs, J. BRIGGS.
CONTROL FOR AUTOMATIC CROSSING GATES.
APPLICATION FILED MAR. 31, 1917.

1,367,684.

Patented Feb. 8, 1921.
3 SHEETS—SHEET 2.

Inventor
Jay Briggs,
By Munday, Evarts, Adcock & Clarke
Attorney

J. BRIGGS.
CONTROL FOR AUTOMATIC CROSSING GATES.
APPLICATION FILED MAR. 31, 1917.
1,367,684. Patented Feb. 8, 1921.
3 SHEETS—SHEET 3.
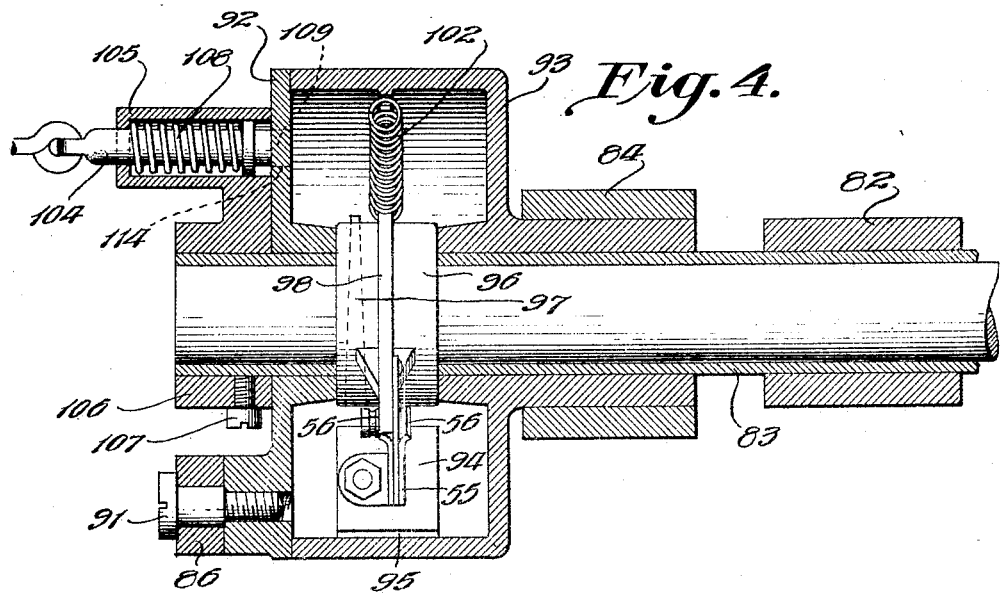
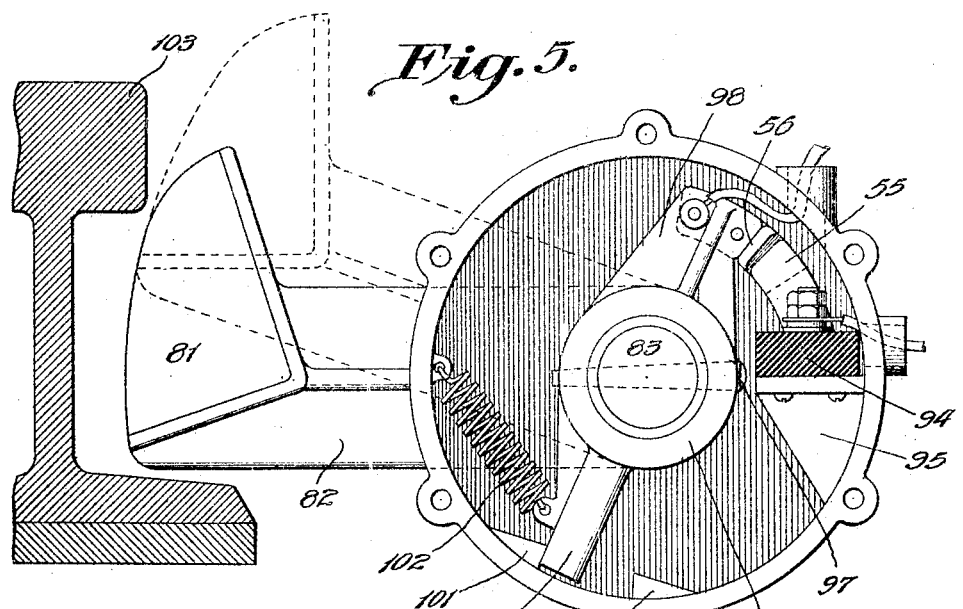
Inventor
Jay Briggs;
By Munday Evarts Adcock & Clarke
Attorney

UNITED STATES PATENT OFFICE.

JAY BRIGGS, OF HOOPESTON, ILLINOIS.

CONTROL FOR AUTOMATIC CROSSING-GATES.

1,367,684.   Specification of Letters Patent.   Patented Feb. 8, 1921.

Application filed March 31, 1917. Serial No. 158,843.

*To all whom it may concern:*

Be it known that I, JAY BRIGGS, a citizen of the United States, residing in Hoopeston, in the county of Vermilion and State of Illinois, have invented a new and useful Improvement in Controls for Automatic Crossing-Gates, of which the following is a specification.

This invention relates in general to controls for automatic crossing gates and has for its object the provision of means for preventing the gate closing down upon a vehicle passing beneath it and from closing down to pen up a vehicle between the gates at opposite sides of the track.

The invention is intended to be used in conjunction with an automatic control for crossing gates which control is designed to be automatically operated to cause operation of the gate in accordance with and through the agencies of trains moving upon the track.

While my present invention has this application it has also other applications and is usable with gates otherwise operated and controlled, the embodiment of it hereinafter described shows the application to an electrically controlled automatic system of the character described and claimed in Letters Patent of the United States No. 1,194,594 issued to me on August 15, 1916.

The invention has for its purpose the provision of a crossing gate which upon the descending upon a wagon, automobile or other vehicle or descending to prevent such vehicles from leaving the tracks upon which they may be at the time will automatically suspend such descending action until such vehicle shall have passed beyond the gate.

A further object of the invention is the provision of a control accomplishing this which after the interruption of its downward movement and the passage of the vehicle will descend if the train movements are such as to render descent still desirable.

A further object of the invention is the provision of a control having these and other advantages which will be of simple construction requiring the provision of few and simple circuits and which may be provided without requiring appreciable alteration in the control circuits and will require no change or alteration in the signal circuits.

Other objects and advantages of the invention will be apparent from the following description which in connection with the accompanying drawings illustrates a preferred embodiment thereof.

Referring to the drawings,—

Figure 1 is a section taken across a railroad track provided with a crossing gate and a control embodying my present invention;

Fig. 4 is a section taken substantially on the line 4—4 of Fig. 3;

Fig. 5 is an end view similar to Fig. 3 with the housing cover removed; and

Fig. 6 is a diagrammatic view of so much of the wiring as is necessary to an understanding of the present invention.

Figure 2:
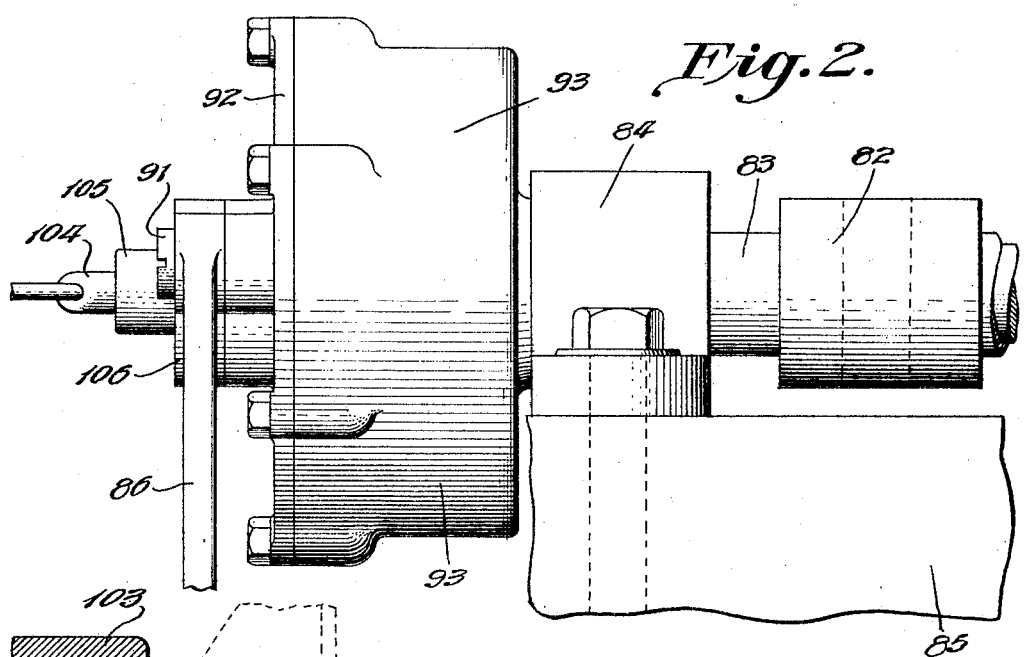
Fig. 2 is an enlarged detail elevation with parts broken away of an end of the operating rod and its housing.

Considering first the system in connection with which the embodiment of my invention being described is adapted for use, reference is had to my earlier patent already herein identified. In my Patent No. 1,194,594 a system of wiring is described which is adapted to take care of all train movements, and this system, it is believed, need not be described in detail in this specification. It should be, however, stated that it contemplates a motor for operating the gate up and down through any suitable mechanism and circuits for controlling the action of this motor as conditions may require. The motor used is a shunt wound motor and the gate is raised and lowered in the present instance by altering the direction of flow of the current through the armature, the direction of flow through the field being maintained always in the same direction. When the track conditions require that the gate be lowered, current flows through the armature in one direction and when they require that the gate be raised current flows through the field in the opposite direction. This shifting of current direction is accomplished automatically. So much of the wiring of the earlier patent as is necessary to an understanding of the present invention is shown in Fig. 6. Viewing this figure it will be noted that there are two sets of fixed contacts, three contacts each, one set being numbered 11, 12 and 13 and the other set 14, 15 and 16, and also two sets of movable contacts numbered 17, 18 and 19 and 21, 22 and 23. The two sets of movable contacts are fixed with relation to each other; and the other contacts 21, 22 and 23 are in contact with contacts 14, 15 and 16 or the contacts 17, 18 and 19 are in contact with the contacts 11, 12 and 13, that is to say contacts 17 to 23 are on a single movable member which is always at one end or the other of its travel. When the contacts 21 to 23 are in contact respectively with contacts 14 to 16 the motor revolves in one direction if current be supplied and in the other when contacts 11 to 13 are engaged by contacts 17 to 19. This will be apparent when it is noted that the field of the motor, indicated by 24, is connected by one wire 25 with a wire 26 connecting contacts 16 and 19, and by another wire 27 with contacts 17, 18, 21 and 22. Wires 28, 29 and 31 lead to a battery or other source of electrical energy and these wires may be considered main power wires. The wire 29 may be taken to be the return wire, and the wires 28 and 31 the wires delivering current to the motor. The circuit is shown as arranged to establish the down circuit, that is to say current may be considered to flow through the armature in the direction of the arrow $a$ and through the field of the motor in the direction of the arrow $b$. Current comes from the wire 31 to contact 14, from contact 14 it is carried to contact 15 by wire 32, from contact 15 it flows to contact 13 by wire 33, from contact 13 by wire 34 to one side of the armature indicated at 35. From the other side of the armature it flows through contact 36 normally closed by front armature bar 37. From contact 36 current flows by wire 38 to contact 12, and from contact 12 by wire 39 to contact 16 which is connected by wire 26 with wire 29 returning to battery. It is intended that this circuit shall be interrupted should it be desirable to obstruct movement of the gate and that coincident with its interruption a separate circuit will be established to give the gate an upward movement, in other words, reverse the flow of current through the armature. In the present embodiment of the invention shown on the drawings the current through the main power wires is cut off entirely from the armature and a separate circuit established through it. This circuit comprises a battery or other suitable source of electrical energy 41 which may, if desired, be the battery supplying current to the wires 28, 29 and 31. This battery is connected by a wire 42 with one side of the armature and by a wire 43 with the other side through contacts 44 adapted to be closed by contact bar 37 when the latter is in proper position as will be later described. The polarity of battery 41 is so arranged that current flows through the armature in the direction of the arrows $c$ which is the opposite direction of current delivered by the wire 34 of the earlier described circuit. It is of course to be understood that the main power circuits are not established until track conditions are appropriate, but the establishment of these circuits beyond the fact that under certain conditions the down circuit is established to lower the gate are not believed to be material or necessary to an understanding of the present invention. Indeed so far as the present invention is concerned the control might be manual, for the equipment of a crossing gate with my present invention will prevent a careless operator from closing the gate down upon a vehicle or penning a vehicle between the two gates at the opposite sides of the track.

The reversal of current and the shifting of circuits is accomplished by a movement of the contact bar 37 from the contacts 36 to the contacts 44. These contacts are preferably mounted in the housing for the crossing gate mechanism which is indicated generally at 51. The present invention contemplates a bar or other member located preferably adjacent a rail of the track, and in order that movement of this bar may result in the shifting of the contacts I provide an auxiliary circuit in which is included a relay the armature of which carries the bar 37. This relay is indicated on the drawing at 52, and is also mounted preferably in the gate housing 51. In the diagrammatic wiring shown in Fig. 6 three movable members are shown, movement of any one of which will cause operation of the relay. The circuit controlling this relay in the present instance is a normally closed one and comprises a low voltage battery 53 from which a wire 54 leads to a fixed contact 55 which is normally engaged by a contact member 56 and through this member contact is made with a contact 57 which is a companion with the contact 55. It will be noted that downward movement of the contact 56 will open the normally connected contacts 55 and 57, the wire 54 connects also other similar sets of contacts 58 and 59 in series, and from the contact 59 a wire 61 leads to one side of the relay. From the other side of the relay a wire 62 leads to the battery 53. The arrangement of the wiring shown in Fig. 6 is the normal arrangement and when the circuit last described is broken at any one of the points 56, 58 or 59 the magnet is deënergized and a spring, indicated at 63, pulls the bar 37 into contact with the contacts 44. This movement reverses the direction of flow of the current through the armature of the motor and thereby, as has been already described, reverses the action of the motor itself.

Means are provided which will be presently described to maintain the up circuit throughout a predetermined period or path of travel of the gate in order that the vehicle effecting the change may have ample opportunity to pass from the track. Thereafter the last described auxiliary circuit returns to normal condition, and if the track conditions, i. e., the direction of train movement still requires it the down circuit is reëstablished and the gate again descends, this time to completely lowered position unless a succeeding vehicle produces a repetition of the operation.

Figure 3:
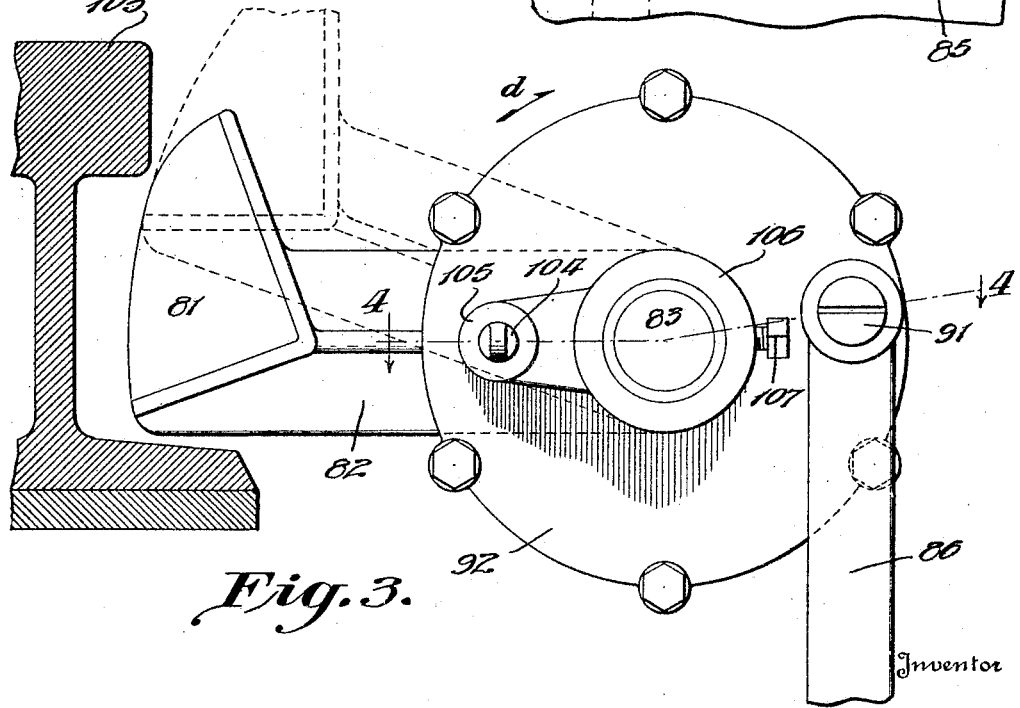
Fig. 3 is an end view of the same.

The mechanism for accomplishing this shifting of circuits is illustrated in Figs. 1 to 5. Reference character 71 indicates the gate which may have any usual or preferred construction and may be connected by any suitable mechanism with the motor which has already been mentioned. Beneath the motor housing and preferably incased in a suitable box 72 a shaft 73 is provided which extends transversely across and beneath the railway road bed. This shaft is connected by a sprocket chain 74 with the shaft 75 operating and moving with the gate. Sprocket chain 74 through a suitable sprocket on the shaft 73 causes an angular movement of the shaft 73 in accordance with the shaft 75. Shaft 73 is provided with two cams 76 and 77. The cam 76 through engagement with a roller 78 upon a lever 79 produces a lifting or upward movement of a bar 81 which is mounted alongside a rail of the track in proper position to be engaged by the vehicle when lifted, said bar being adapted to drop beneath the road level after actuation, When the gate starts down this bar is projected and when a vehicle rides over it it can be depressed to effect the changing of the circuits as described.

The bar 81 is carried upon the outer ends of arms 82 fast on a shaft 83 which is journaled in suitable bearings 84 mounted upon the ties 85. This shaft is connected with the lever 79 so that depression of the lever produces a rotation or angular movement of of the shaft 83 in the direction of the arrow d. This angular movement is given the shaft 83 by a pitman or connecting rod 86 secured at one end to the lever 79 and at the other end to a stud 91 provided in a housing cover 92 of a housing 93 which is upon the end of the shaft 83. This housing carries a pair of contacts 55 and 57 which are mounted upon a plate of insulating material 94 mounted upon a bracket 95 within the housing. The contact 56 is carried upon a double armed member 96 keyed at 97 to the shaft 83. This member has two arms 98 and 99. One arm 98 carries the contact member 56 and the other arm 99 is movable between stops 101 on the inside of the housing. A spring 102 pulls the two armed member to the position shown in Fig. 5 so that the contacts are in engagement. It will be noted that a downward pull on the pitman or connecting rod 86 will cause a rotation of the shaft and housing in a clockwise direction to elevate the bar 81 from the position shown in full lines in Fig. 5 to the position shown in dotted lines in this figure. The rail indicated in section at 103 is so disposed that the bar when lifted will be arranged to extend slightly above it. If the vehicle pass over this bar when thus arranged and while the cam 76 is still holding the housing in the position resulting from the elevation of the bar the resulting lowering movement of the bar will cause a slight rotation of the shaft with respect to the housing and a consequent separation of contacts 55—57 and 56. This action results in a shifting of the circuits.

In order that the gate may be caused to travel upwardly a predetermined distance means are provided to lock the housing and shaft in this altered or abnormal relation. These means consist of a locking pin 104 which is mounted to reciprocate in a hollow boss 105 carried upon a collar 106 secured upon the shaft 83 as by a set screw 107. A spring 108 embraces the locking pin within the boss. The inner end 109 of this pin slides upon the outer face of the housing cover, and when the parts are arranged in lowered position this end of the pin is opposite an opening through said cover. It is normally prevented from entering said opening however by a lever 111 which carries a roller 112 engageable by the cam 77 already mentioned, the lever being connected by a chain or link or the like 113 with the outer end of the pin.

When the bar is depressed by a vehicle the cam 77 has left the roller 112 and the pin may enter the opening 114 in the housing cover, thus locking the shaft 103 and the housing together until such time as the cam 77 reëngages the roller 112 when release occurs. While the lock is operative the relay is deënergized and the up circuit established with a corresponding interruption of the normal down circuit.

It is thought that the invention and many of its attendant advantages will be understood from the foregoing without further description, and it will be manifest that the invention may be embodied in other structures and that the parts and their arrangement as described may be altered without departing from the spirit and scope of the invention, the form of the invention hereinbefore described being merely a preferred embodiment thereof.

What I claim is:

1. A control for crossing gates, comprising in combination, a gate, mechanism for opening and closing the gate, means causing said mechanism to impart a closing movement to the gate, means for causing said mechanism to impart an opening movement to the gate, and means located in the pathway to be closed by the gate and adapted to be operated by an obstruction in said pathway for causing interruption of the closing movement of the gate and an opening movement thereof to a predetermined intermediate point, and means automatically operating at said point for causing the mechanism to impart closing movement to the gate.

2. A control for crossing gates, comprising in combination, a gate, mechanism for opening and closing said gate, and means located in the pathway to be closed by the gate and operable by an obstruction in said pathway for temporarily reversing the closing movement of the gate and lifting it to a predetermined height and thereafter automatically rendering said mechanism active to close the gate.

3. A control for crossing gates, comprising in combination, a gate, mechanism for opening and closing the gate, means operable by an obstruction in the pathway to be closed by the gate and in advance of possible engagement of said gate with said obstruction for reversing closing movement of said mechanism temporarily, and means rendering said mechanism active for closing the gate when the gate reaches a predetermined intermediate height.

4. A control for crossing gates, comprising in combination, a gate, mechanism for opening and closing said gate, and means located without the path of travel of the gate and engageable by a vehicle in the pathway to be closed by the gate for operating said mechanism and reversing the same temporarily and merely until the gate has been lifted to a predetermined intermediate height.

5. A control for a crossing gate comprising in combination a gate, mechanism for raising and lowering said gate, up and down main circuits for operating said mechanism and an auxiliary up circuit and a control circuit including a relay for interrupting the main down circuit and establishing the auxiliary up circuit by a vehicle caught in the path to be closed by the gate.

6. A control for crossing gates comprising in combination a gate, mechanism for raising and lowering said gate, an electric circuit for operating said mechanism to raise the gate, an electric circuit for operating said mechanism to lower the gate, an auxiliary electric circuit for raising the gate, said last mentioned circuit being operable by a vehicle approaching the gate.

7. A control for crossing gates comprising in combination a gate, mechanism for raising and lowering said gate, an electric circuit for operating said mechanism to raise the gate, an electric circuit for operating said mechanism to lower the gate, an auxiliary electric circuit for raising the gate, vehicle operated circuit closing means independent of the gate in said last mentioned circuit adapted to be closed by a vehicle approaching the gate and means for locking said auxiliary circuit in operative condition for a predetermined time at each operation thereof.

8. In a control for a crossing gate, the combination of a crossing gate, opening and closing mechanism therefor, and means operable by a vehicle as it approaches said gate for imparting to the gate a controlled delay for a substantial period of time, said mechanism immediately thereafter closing said gate.

9. A control for a crossing gate, comprising in combination a crossing gate, opening and closing mechanism therefor, and means operable by a vehicle approaching said gate for halting downward movement of said gate and imparting to said gate an upward movement for a distance less than the distance to fully opened position.

10. A control for a crossing gate, comprising in combination a gate, mechanism for opening and closing said gate, a device located alongside the track, and normally protected thereby, for interrupting the closing movement of the gate when engaged by a vehicle in the path to be closed by the gate.

11. A control for a crossing gate comprising in combination a gate, mechanism for opening and closing said gate, a member alongside and normally beneath the top of a rail for interrupting the closing movement of the gate, and means connected to the gate for lifting said member to operative position as said gate descends.

12. A control for a railway crossing gate, comprising in combination a crossing gate, closing and opening mechanism for actuating the same, means for imparting closing action to said mechanism, means operable by a vehicle approaching the gate for temporarily rendering said first mentioned means inactive when the vehicle is approaching the gate in closing, and means operable by said vehicle-operated means for imparting to said mechanism an opening movement to a predetermined height after actuation of said vehicle-operated means.

JAY BRIGGS.